United States Patent
Qian et al.

(10) Patent No.: US 11,526,061 B2
(45) Date of Patent: Dec. 13, 2022

(54) LIGHT MODULATING LIQUID CRYSTAL CELL, DISPLAY PANEL AND DISPLAY DEVICE

(71) Applicant: Tianma Micro-Electronics Co., Ltd., Shenzhen (CN)

(72) Inventors: Cheng Qian, Shanghai (CN); Xu Jiang, Shanghai (CN); Kaihong Huang, Shanghai (CN); Mingji Xu, Xiamen (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 17/138,758

(22) Filed: Dec. 30, 2020

(65) Prior Publication Data

US 2021/0116767 A1    Apr. 22, 2021

(30) Foreign Application Priority Data

Nov. 3, 2020  (CN) .......................... 202011208557.6

(51) Int. Cl.
  *G02F 1/1362*  (2006.01)
  *G02F 1/1368*  (2006.01)

(52) U.S. Cl.
  CPC ...... *G02F 1/136286* (2013.01); *G02F 1/1368* (2013.01); *G02F 1/136277* (2013.01)

(58) Field of Classification Search
  CPC ......... G02F 1/136277; G02F 1/136286; G02F 1/1368
  See application file for complete search history.

(56) References Cited

U.S. PATENT DOCUMENTS

| | | | | |
|---|---|---|---|---|
| 2008/0284931 A1* | 11/2008 | Kimura | ............... | G02F 1/13624 349/39 |
| 2018/0120654 A1* | 5/2018 | Tsu | .................... | G02F 1/134336 |
| 2019/0302543 A1* | 10/2019 | Chen | ................. | G02F 1/134309 |
| 2020/0333674 A1* | 10/2020 | Zhao | ................... | G02F 1/13624 |

FOREIGN PATENT DOCUMENTS

| | | |
|---|---|---|
| CN | 101308301 A | 11/2008 |
| CN | 109407429 A | 3/2019 |
| CN | 110286533 A | 9/2019 |

OTHER PUBLICATIONS

Chinese Office Action dated Oct. 27, 2022, issued in related Chinese Application No. 2020112088557.6 filed Nov. 3, 2020, 13 pages.

* cited by examiner

*Primary Examiner* — Dung T Nguyen
(74) *Attorney, Agent, or Firm* — Christensen O'Connor Johnson Kindness PLLC

(57) ABSTRACT

A light modulating liquid crystal cell, a display panel, and a display device are provided. The light modulating liquid crystal cell has a light-exiting area and a non-light-exiting area surrounding the light-exiting area and includes first pixels located in the light-exiting area. Each first pixel includes first sub-pixels, and each first sub-pixels includes a first transistor. The first sub-pixels include at least two first sub-pixels arranged in a first direction and at least two first sub-pixels arranged in a second direction, and the first direction intersects the second direction. In the first sub-pixels of one first pixel, gate electrodes of the first transistors are electrically connected to a same first scanning line, and source electrodes of the first transistors are electrically connected to a same first data line.

18 Claims, 13 Drawing Sheets

LIGHT MODULATING LIQUID CRYSTAL CELL, DISPLAY PANEL AND DISPLAY DEVICE

CROSS-REFERENCE TO RELATED APPLICATIONS

The present application claims priority to Chinese Patent Application No. 202011208557.6, filed on Nov. 3, 2020, the content of which is incorporated herein by reference in its entirety.

TECHNICAL FIELD

The present application relates to the field of display technology, and particularly, to a light modulating liquid crystal cell, a display panel, and a display device.

BACKGROUND

A multi-liquid crystal cell display panel includes at least one liquid crystal cell serving as a light modulating liquid crystal cell configured to modulate the light incident to a display liquid crystal cell. When displaying a black image, both a pixel in the light modulating liquid crystal cell and a pixel in the display liquid crystal cell are opaque simultaneously, thereby achieving a better black state and greatly improving a contrast of the multi-liquid crystal cell display panel.

In the multi-liquid crystal cell display panel, one pixel of the light modulating liquid crystal cell corresponds to multiple pixels of the display liquid crystal cell, and an area of the pixel of the light modulating liquid crystal cell is greater than an area of the pixel of the display liquid crystal cell. The light modulating liquid crystal cell further includes signal lines, each of which is arranged between pixels, and an interval between the signal lines of the light modulating liquid crystal cell is larger than an interval between signal lines of the display liquid crystal cell. Therefore, among the multiple pixels of the display liquid crystal cell which correspond to the one pixel of the light modulating liquid crystal cell, the pixel farther from the signal line has a higher luminance, and the pixel closer to the signal line has a lower luminance, which leads to a grid pattern on the display image of the display liquid crystal cell.

SUMMARY

In an aspect, an embodiment of the present disclosure provides a light modulating liquid crystal cell. The light modulating liquid crystal cell has a light-exiting area and a non-light-exiting area surrounding the light-exiting area and includes a plurality of first pixels located in the light-exiting area, first scanning lines, and first data lines. Each of the plurality of first pixels includes a plurality of first sub-pixels, and each of the plurality of first sub-pixels includes a first transistor. The plurality of first sub-pixels includes at least two first sub-pixels arranged in a first direction and at least two first sub-pixels arranged in a second direction, and the first direction intersects the second direction. Gate electrodes of the first transistors of the plurality of first sub-pixels of each of the plurality of first pixels are all electrically connected to one of first scanning lines, and source electrodes of the first transistors are all electrically connected to one of first data lines.

In another aspect, an embodiment of the present disclosure provides a display panel. The display panel includes the light modulating liquid crystal cell provided by the above aspect and a display liquid crystal cell. The light modulating liquid crystal cell and the display liquid crystal cell are stacked together. The display liquid crystal cell includes a display area and a non-display area surrounding the display area. In a thickness direction of the display panel, the light-exiting area of the light modulating liquid crystal cell covers the display area of the display liquid crystal cell. The display liquid crystal cell includes a plurality of second sub-pixels located in the display area, each of the plurality of second sub-pixels includes a second transistor and a color resist, a gate electrode of the second transistor is electrically connected to a second scanning line, a source electrode of the second transistor is electrically connected to a second data line, and the color resist is located on a side of the second transistor facing away from the light modulating liquid crystal cell.

In yet another aspect, an embodiment of the present disclosure provides a display device. The display device includes the display panel provided by the above aspect and a backlight module. In a thickness direction of the display device, the backlight module is located on a side of the light modulating liquid crystal cell facing away from the display liquid crystal cell.

BRIEF DESCRIPTION OF DRAWINGS

In order to more clearly explain technical solutions of embodiments of the present disclosure, the drawings of the embodiments are briefly described as below. The drawings described below are merely some of the embodiments of the present disclosure. On basis of these drawings, those skilled in the art can obtain other drawings.

DESCRIPTION OF EMBODIMENTS

For better understanding of the technical solution of the present disclosure, the embodiments of the present disclosure are described in detail as below.

It should be understood that the embodiments described below are merely some of, rather than all of the embodiments of the present disclosure. Based on the embodiments described in the present disclosure, other embodiments obtained by those skilled in the art shall fall within the scope of protection of the present disclosure.

The terms used in the embodiments of the present disclosure are merely for the purpose of describing specific embodiments, but not intended to limit the present disclosure. The singular forms of "a", "an" and "the" used in the embodiments of the present disclosure and the appended claims are also intended to indicate plural forms, unless clearly indicating others.

It should be understood that the term "and/or" used herein merely indicates a relationship describing associated objects, indicating three possible relationships. For example, A and/or B can indicate: A alone, A and B, or B alone. In addition, the character "/" in this description generally means that the associated objects are in an "or" relationship.

It is to be understood that the terms "substantially", "approximate", "roughly", "about", "basically", "generally", and the like as used in the claims and embodiments of the present disclosure indicate an object that can be generally accepted within a reasonable process operation or within the tolerance range, rather than an exact value.

It should be understood that, although the terms first, second, third, etc. in the embodiments of the present disclosure are used to describe pixels, these pixels should not be limited to these terms, and these terms are only used to distinguish the pixels from each other. For example, without departing from the scope of the embodiments of the present disclosure, the first pixel can also be referred to as the second pixel, and similarly, the second pixel can also be referred to as the first pixel.

The applicant of this disclosure provided solutions to the problems existing in the related art through careful and in-depth research.

Embodiments of the present disclosure provide a light modulating liquid crystal cell, a display panel, a display device, and a display method of the display device.

Figure 1:
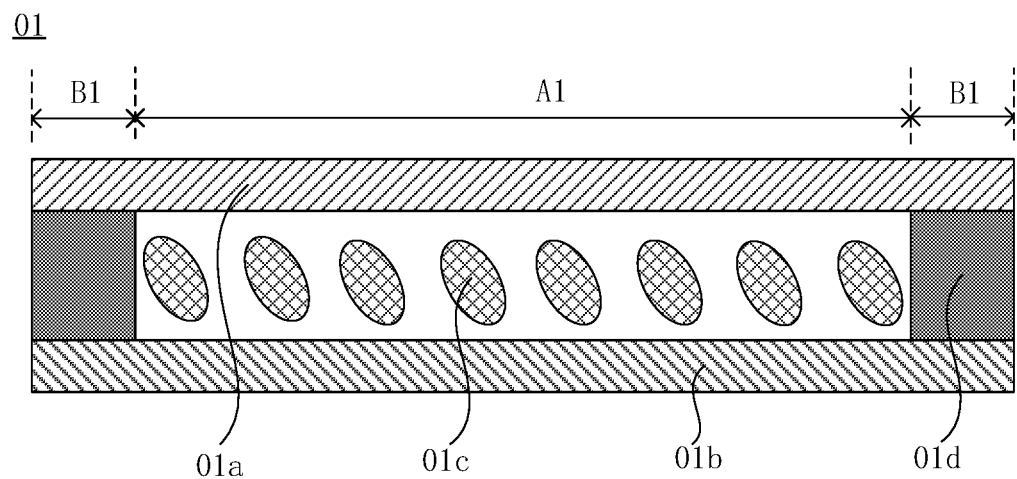
FIG. 1 is a cross-sectional view of a light modulating liquid crystal cell according to an embodiment of the present disclosure.
Figure 2:
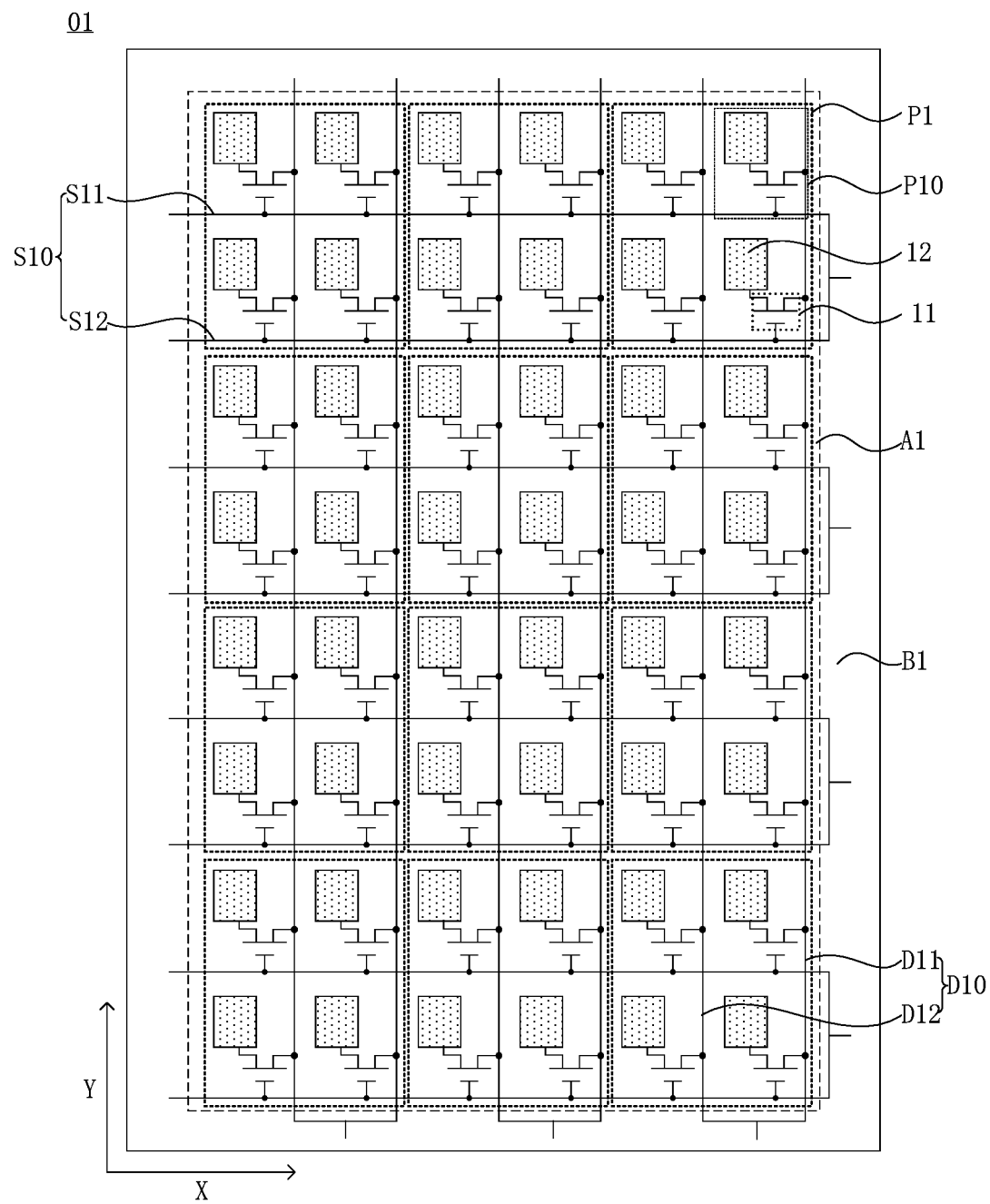
FIG. 2 is a plan view of a light modulating liquid crystal cell according to an embodiment of the present disclosure.

FIG. 1 is a cross-sectional view of a light modulating liquid crystal cell according to an embodiment of the present disclosure. FIG. 2 is a plan view of a light modulating liquid crystal cell according to an embodiment of the present disclosure.

Referring to FIG. 1 and FIG. 2, an embodiment of the preset disclosure provides a light modulating liquid crystal cell 01. The light modulating liquid crystal cell 01 has a light-exiting area A1 and a non-light-exiting area B1 surrounding the light-exiting area A1. The light-exiting area A1 can allow visible light to pass through the light modulating liquid crystal cell 01. The non-light-exiting area B1 does not allow visible light to pass through the light modulating liquid crystal cell 01 and can be a packaging area of the light modulating liquid crystal cell 01.

As shown in FIG. 1, the light modulating liquid crystal cell 01 can include a first substrate 01$a$, a first liquid crystal layer 01$c$, a second substrate 01$b$, and a first encapsulation structure 01$d$, which are arranged in a thickness direction of the light modulating liquid crystal cell 01. The first substrate 01$a$ and the second substrate 01$b$ are arranged opposite to each other, and the first liquid crystal layer 01$c$ is arranged between the first substrate 01$a$ and the second substrate 01$b$. The first liquid crystal layer 01$c$ is arranged at a position of the light modulating liquid crystal cell 01 corresponding to the light-exiting area A1. When liquid crystal molecules in the first liquid crystal layer 01$c$ are deflected under an electric field, light is allowed to pass, otherwise the light cannot pass. The first encapsulation layer 01$d$ is arranged between the first substrate 01$a$ and the second substrate 01$b$. The first encapsulation layer 01$d$ is arranged at a position of the light modulating liquid crystal cell 01 corresponding to the non-light-exiting area B1, and is configured to encapsulate the first substrate 01$a$ and the second substrate 01$b$.

Referring to FIG. 2, a plurality of first pixels P1 are located in the light-exiting area A1, and each first pixel P1 includes a plurality of first sub-pixels P10. Each first pixel P1 includes at least two first sub-pixels P10 arranged in a first direction X and at least two first sub-pixels P10 arranged in a second direction Y. The first direction X intersects the second direction Y. For example, the first direction X is perpendicular to the second direction Y. That is, the plurality of first sub-pixels P10 of one first pixel P1 are arranged adjacently. As shown in FIG. 2, one first pixel P1 includes two first sub-pixels P10 arranged in the first direction X and two first sub-pixels P10 arranged in the second direction Y.

With continued reference to FIG. 2, the first sub-pixel P10 includes a first transistor 11, and the first transistor 11 can be configured to control a voltage for driving the liquid crystal molecules to deflect, to be transmitted to the corresponding first sub-pixel P10, thereby controlling the corresponding first sub-pixel P10 to be light transmissive. In the plurality of first sub-pixels P10 of one first pixel P1, gate electrodes of the first transistors 11 are electrically connected to a same first scanning line S10, and source electrodes of the first transistors 11 are electrically connected to a same first data line D10. That is, the gate electrodes of the first transistors 11 corresponding to the plurality of first sub-pixels P10 of a same first pixel P1 are electrically connected to a same first scanning line S10, and the source electrodes of the first transistors 11 corresponding to the plurality of first sub-pixels P10 of a same first pixel P1 are electrically connected to a same first data line D10. The first scanning line S10 can transmit a signal for controlling the first transistor 11 to be turned on and turned off. The first data line D10 can be configured to transmit the voltage signal for controlling the liquid crystal molecules to deflect and the voltage signal for controlling the liquid crystal molecules not to deflect.

The gate electrodes of the first transistors 11 corresponding to the plurality of first sub-pixels P10 of a same first pixel P1 have a same potential, that is, the first transistors 11 corresponding to the plurality of first sub-pixels P10 of a same first pixel P1 can be turned on simultaneously or turned off simultaneously. In addition, the source electrodes of the first transistors 11 corresponding to the plurality of first sub-pixels P10 of a same first pixel P1 have a same potential. That is, the first transistors 11 corresponding to the plurality of first sub-pixels P10 of a same first pixel P1 can simultaneously receive and transmit the voltage signal for controlling the liquid crystal molecules to deflect, or simultaneously receive and transmit the voltage signal for controlling the liquid crystal molecules not to deflect. Therefore, the plurality of first sub-pixels P10 of a same first pixel P1 can be light transmissive at the same time or be opaque at the same time, or display a same gray scale (allowing a part of light to pass through). That is, all regions of one first pixel P1 can be light transmissive at the same time, or be opaque at the same time, or display the same gray scale at the same time.

Accordingly, first transistors 11 corresponding to any two first sub-pixels P10 of different first pixels P1 have two gate electrodes respectively electrically connected to different first scanning lines S10, and/or source electrodes respectively electrically connected to different first data lines D10. For example, as shown in FIG. 2, among all the first pixels P1 arranged in the first direction X and in the same row, the first data line D10 to which the first transistors 11 in any one first pixel P1 are connected is different from the first data line D10 to which the first transistors 11 in another first pixel P1 are connected. Among all the first pixels P1 arranged in the second direction Y and in the same column, the first scanning line S10 to which the first transistors 11 in any one first pixel P1 are connected is different from the first scanning line S10 to which the first transistors 11 in another first pixel P1 are connected. Therefore, the first sub-pixels P10 of different first pixels P1 can be light transmissive non-simultaneously, or be opaque non-simultaneously. That is, different first pixels P1 can be light transmissive or be opaque region independently.

The light modulating liquid crystal cell 01 provided by embodiments of the present disclosure can be used in a liquid crystal display panel including double liquid crystal cells, one liquid crystal cell is the light modulating liquid crystal cell 01 provided by the embodiments of the present disclosure, and the other liquid crystal cell is a display liquid crystal cell for emitting light to display images. The light modulating liquid crystal cell 01 can be controlled such that a part or an entirety of the display liquid crystal cell receives light for displaying, or the light modulating liquid crystal cell 01 can be controlled such that a part or an entirety of the display liquid crystal cell cannot receive light, or the light modulating liquid crystal cell 01 can be controlled such that a part of the display liquid crystal cell can receive a preset amount of light, thereby precisely controlling the contrast. When the display liquid crystal cell needs to display a black image, the first pixels P1 of the light modulating liquid crystal cell 01 covered by the black image do not allow light to pass through, and at the same time, the pixels in the display liquid crystal cell covered by the black image also do not allow light to pass through, such that the black image has a better (improved) black state, thereby improving the contrast of the display panel.

Meanwhile, one first pixel P1 includes a plurality of first sub-pixels P10 and the first transistors 11 of the plurality of first sub-pixels P10 are all electrically connected to the first scanning line S10 and the first data line D10, so the first scanning lines S10 are relatively evenly distributed and the first data lines D10 are relatively evenly distributed in the region of the light modulating liquid crystal cell 01 where the first pixel 10 is located. That is, signal lines are relatively evenly distributed in the first pixel P1 with a larger area, so that light transmitted from each part of one first pixel P1 has uniform brightness, and thus the light passing through the light modulating liquid crystal cell 01 has uniform brightness, thereby solving the problem that the light passing through the light modulating liquid crystal cell 01 and received by different pixels of the display liquid crystal cell has uneven brightness due to a low distribution density of metal signal lines.

In addition, in embodiments of the present disclosure, one first pixel P1 includes a plurality of first sub-pixels P10 and each first sub-pixel P10 is electrically connected to corresponding signal lines, so the driving ability of the first pixel P1 is improved, ensuring that the light passing through the first pixel P1 has a higher brightness and avoiding large signal line widths which are needed by the first pixel P1 for improving the driving ability, but, in turn, reduce the light-transmitting area. In addition, the plurality of first sub-pixels P10 of one first pixel are electrically connected to the same first scanning line S10 and the same first data line D10, so the gate electrodes of the plurality of first transistors 11 in one first pixel P1 can receive the signal from a same port, and the source electrodes of the plurality of first transistors 11 in one first pixel P1 can receive the signal from a same port, reducing the circuit design difficulty of the light modulating liquid crystal cell 01 and reducing the power consumption.

Referring to FIG. 2, in an embodiment of the present disclosure, in all the first pixels P1 arranged along the first direction X and in the same row, the gate electrodes of the first transistors 11 are electrically connected to the same first scanning line S10. As shown in FIG. 2, the first scanning line S10 overall extends in a direction parallel to the first direction X, and the first transistors 11 corresponding to the first pixels P1 arranged along the first direction X are electrically connected to the same first scanning line S10.

The gate electrodes of the first transistors 11 in the first pixels P1 arranged in the first direction X are all electrically connected to the same first scanning line S10, and therefore the quantity of the first scanning lines S10 and the design difficulty are reduced, the area of the part allowing light to pass through of the light-exiting area A1 of the light modulating liquid crystal cell 01 is increased, thereby improving the luminance of light exiting light modulating liquid crystal cell 01.

In an embodiment, a semiconductor layer of the first transistor 11 can be one of an amorphous silicon layer, a polysilicon layer and an oxide semiconductor layer. When the semiconductor layer of the first transistor 11 is an amorphous silicon layer, the design of the first pixel P1 in the embodiment of the present disclosure can significantly improve a low luminance and an uneven display luminance of the light-modulating display panel caused by the poor driving ability of the amorphous silicon first transistor.

Figure 3:
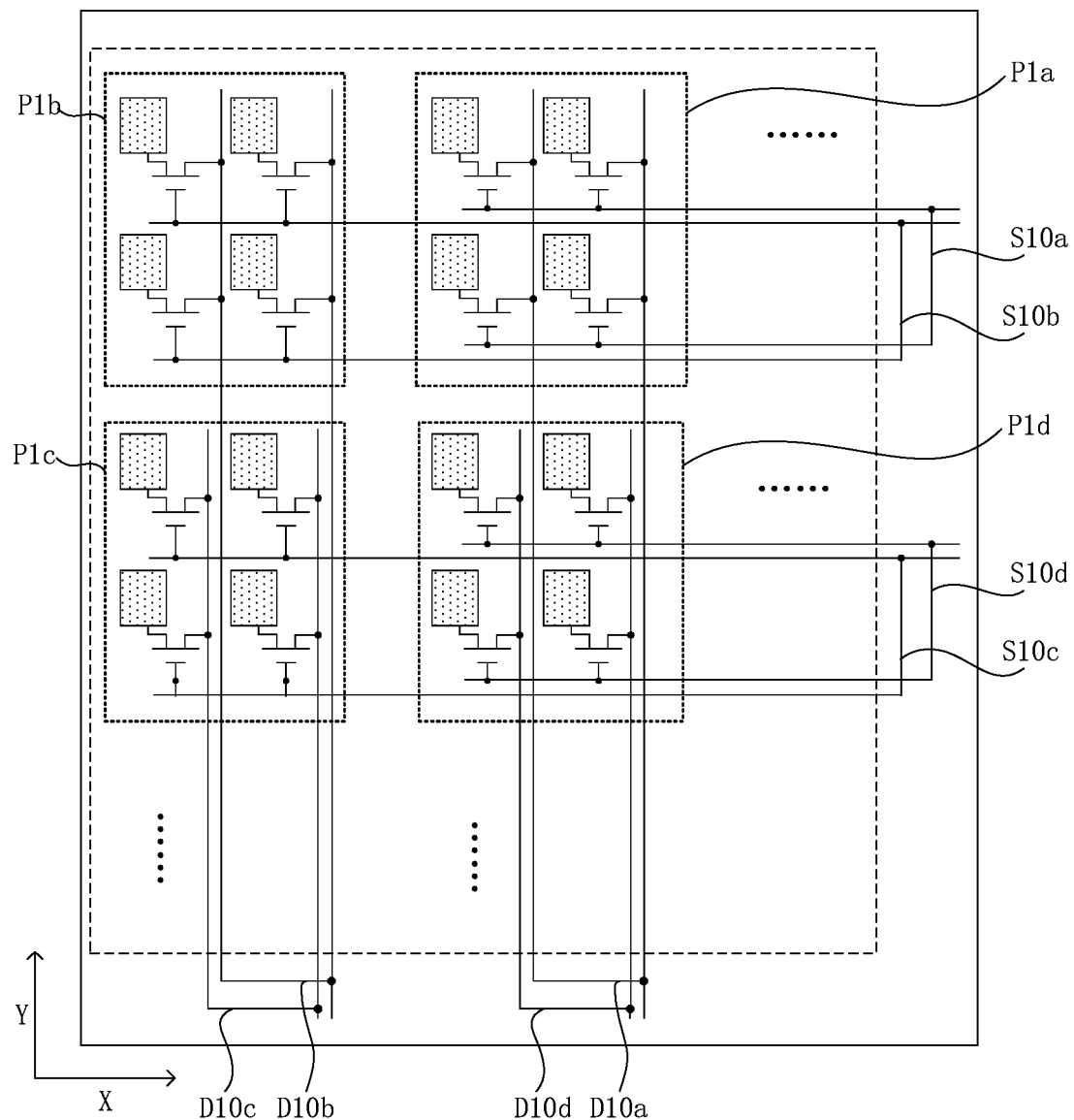
FIG. 3 is a plan view of another light modulating liquid crystal cell according to an embodiment of the present disclosure.

FIG. 3 is a plan view of another light-modulating cell according to an embodiment of the present disclosure.

As shown in FIG. 3, in another embodiment of the present disclosure, among at least two first pixels P1 arranged in the first direction X and in the same row, the gate electrodes of the first transistors 11 in one first pixel P1 are electrically connected to a same first scanning line S10, and the gate electrodes of the first transistors 11 in another one first pixel P1 are electrically connected to another first scanning line S10. That is, in multiple first pixels P1 arranged in the first direction X, at least two first pixel P1 have the gate electrodes of the first transistors 11 respectively electrically connected to different first scanning lines S10.

With the configuration that the gate electrodes of the first transistors 11 in at least two of the first pixels P1 arranged in the first direction X are electrically connected to different first scanning lines S10, in the light-exiting area A1 of the light modulating liquid crystal cell 01, the part allowing light to pass through and the part not allowing light to pass through can be flexibly controlled. For example, if a certain part of the liquid crystal display panel always displays black in two adjacent frames, and another part of the liquid crystal display panel display variable bright images in the two adjacent frames, the first scanning line S10 electrically connected to the first transistors 11 of the first pixel P1 in this part is different from the first scanning line S10 electrically connected to the first transistors 11 of the first pixel P1 located in the another part and arranged in the first direction X, and thus the first scanning line S10 corresponding to the part displaying the black image does not need to receive a new signal and the corresponding first data line D10 also does not need to transmit the voltage signal for controlling this part to keep displaying black image, thus reducing the power consumption.

Continuing to refer to FIG. 2, in another embodiment of the present disclosure, the source electrodes of the first transistors 11 in all the first pixels P1 arranged in the second direction Y and in the same column are electrically connected to a same first data line D10. The first data line D10 overall extends in a direction parallel to the second direction Y, and the first transistors 11 corresponding to the first pixels P1 arranged in the second direction Y are electrically connected to the same data line D10.

With the configuration that the source electrodes of the first transistors 11 in all the first pixels P1 arranged in the second direction Y are all electrically connected to the same first data line D10, the quantity of the first data lines D10 and the design difficulty are reduced. In addition, the area of the part allowing light to pass through of the light-exiting area A1 is increased, thereby increasing the luminance of the light exiting the light modulating liquid crystal cell 01.

Continuing to refer to FIG. 3, in yet another embodiment of the present disclosure, in at least two first pixels P1 arranged in the same column and in the second direction Y, the source electrodes of the first transistors 11 in one first pixel P1 are electrically connected to the same first data line D10, and the source electrodes of the first transistors 11 in another first pixel P1 are electrically connected to another first data line D10.

With the configuration that the source electrodes of the first transistors 11 of at least two of the first pixels P1 arranged in the second direction Y are electrically connected to different first data lines D10, in the light-exiting area A1 of the light modulating liquid crystal cell 01, the part allowing light to pass through and the part not allowing light to pass through can be flexibly controlled. For example, if a certain part of the liquid crystal display panel always displays black images in two adjacent frames, and other parts of the liquid crystal display panel display variable images in two adjacent frames, the first data line D10 connected to the first transistor 11 of the first pixel P1 arranged in this part is different from the first data line D10 connected to the first transistor 11 of the first pixel P1 arranged in another part and in the first direction X, and thus the data scanning line D10 corresponding to the part displaying black image does not need to receive a new signal and the corresponding first data line D10 also does not need to transmit the voltage signal for controlling this part to keep displaying black image, reducing the power consumption.

In an embodiment of the present disclosure, as shown in FIG. 2, the gate electrodes of the first transistors 11 in all the first pixels P1 arranged in the first direction X and in the same row are electrically connected to the same first scanning line S10, and the source electrodes of the first transistors 11 in all the first pixels P1 arranged in the second direction Y and in the same column are electrically connected to the same first data line D10.

In another embodiment of the present disclosure, as shown in FIG. 3, in at least two first pixels P1 which are arranged in the first direction X and in the same row, the gate electrodes of the first transistors 11 of one first pixel P1 are electrically connected to the same first scanning line S10, and the gate electrodes of the first transistors 11 of another first pixel P1 are electrically connected to another first scanning line S10. In at least two first pixels P1 which are arranged in the second direction Y and in the same column, the source electrodes of the first transistors 11 in one first pixel P1 are electrically connected to the same first data line D10, and the source electrodes of the first transistors 11 in another first pixel P1 are electrically connected to another first data line D10.

For example, the gate electrodes of the first transistors 11 in different first pixels P1 are all electrically connected to different first scanning lines S10, and the source electrodes of the first transistors 11 in different first pixels P1 are all electrically connected to different first data lines D10. FIG. 3 illustrates four first pixels P1, i.e., the first pixel P1a, the first pixel P1b, the first pixel P1c, and the first pixel P1d. The first scanning line S10 to which the gate electrodes of the first transistors 11 in the first pixel P1a are connected is the first scanning line S10a, and the first data line D10 to which the source electrodes of the first transistors 11 in the first pixel P1a are connected is the first data line D10a. The first scanning line S10 to which the gate electrodes of the first transistors 11 in the first pixel P1b are connected is the first scanning line S10b, and the first data line D10 to which the source electrodes of the first transistors 11 in the first pixel P1b are connected is the first data line D10b. The first scanning line S10 to which the gate electrodes of the first transistors 11 in the first pixel P1c are connected is the first scanning line S10c, and the first data line D10 to which the source electrodes of the first transistors 11 in the first pixel P1c are connected is the first data line D10c. The first scanning line S10 to which the gate electrodes of the first transistors 11 in the first pixel P1d are connected is the first scanning line S10d, and the first data line D10 to which the source electrodes of the first transistors 11 in the first pixel P1d are connected is the first data line D10d.

As shown in FIG. 2 and FIG. 3, the first pixel P1 includes at least two first sub-pixels P10 which are arranged in the second direction Y. In order to achieve the configuration that the gate electrodes of all the first transistors 11 in the same first pixel P1 are all electrically connected to the same first scanning line S10, the first scanning line S10 to which all the first transistors 11 in the first pixel P1 are connected includes a plurality of first sub-scanning lines, and the plurality of first sub-scanning lines are arranged in the second direction Y and each extend in the first direction X. The plurality of first sub-scanning lines of the first scanning line S10 to which all the first transistors 11 in the first pixel P1 are connected are electrically connected to each other, and the plurality of first sub-scanning lines is connected to each other in the non-light-exiting area B1. As shown in FIG. 2, the first scanning line S10 includes a first sub-scanning line S11 and a second sub-scanning line S12, and the first sub-scanning line S11 and the second sub-scanning line S12 are electrically connected to each other in the non-light-exiting area B1.

If the plurality of first sub-scanning lines of the first scanning line S10 is connected to each other in the light-exiting area A1, more wires are required to electrically connect the plurality of first sub-scanning lines, which increases the design difficulty and affecting the area of the light-exiting part. Since the plurality of first sub-scanning lines of the first scanning line S10 is connected to each other in the non-light-exiting area B1, the above problem is solved.

In an embodiment, an interval between two adjacent first sub-scanning lines which are arranged in the second direction Y is smaller than or equal to 250 μm. As shown in FIG. 2, the first sub-scanning line S11 and the second sub-scanning line S12 of the same first scanning line S10 are adjacent to each other, and the interval between the first sub-scanning line S11 and the second sub-scanning line S12 is smaller than or equal to 250 μm. When the interval between the first sub-scanning lines is smaller than or equal to 250 μm, the problem of grid pattern can be solved. For the intelligent display terminal, the distance between the viewer and the screen of the intelligent display terminal is about 25 cm to 35 cm. In such a distance, human eyes basically cannot distinguish two objects that are separated 250 μm, and therefore the problem of grid pattern can be solved by setting the interval between two sub-scanning lines to be smaller than 250 μm.

As shown in FIG. 2 and FIG. 3, the first pixel P1 includes at least two first sub-pixels P10 arranged in the first direction X. In order to achieve the configuration that the source electrodes of all the first transistors 11 in the same first pixel P1 are electrically connected to the same first data line D10, the first data line D10 to which all the first transistors 11 in the first pixel P1 are connected includes a plurality of first sub-data lines, and the plurality of first sub-data lines are arranged in the first direction X and each extend in the second direction Y. The plurality of first sub-data lines of the first data line D10 to which all the first transistors 11 in the first pixel P1 are connected are electrically connected, and the plurality of first sub-data lines is connected to each other in the non-light-exiting area B1. As shown in FIG. 2, the first data line D10 includes a first sub-data line D11 and a second sub-data line D12, and the first sub-data line D11 and the second sub-data line D12 are connected to each other in the non-light-exiting area B1.

If the plurality of first sub-data lines of the first data line D10 is connected to each other in the light-exiting area A1, more wires are required to electrically connect the plurality of first sub-data lines, which increases the design difficulty and affecting the area of the light-exiting part. Since the plurality of first sub-data lines of the first data line D10 is connected to each other in the non-light-exiting area B1, the above problem is solved.

In an embodiment, an interval between two adjacent first sub-data lines which are arranged in the first direction X is smaller than or equal to 250 μm. As shown in FIG. 2, the first sub-data line D11 and the second sub-data line D12 of the same first data line D10 are adjacent to each other, and the interval between the first sub-data line D11 and the second sub-data line D12 is smaller than or equal to 250 μm. Through simulation, when the interval between the first sub-data lines is smaller than or equal to 250 μm, the problem of grid pattern can be effectively solved.

Figure 4:
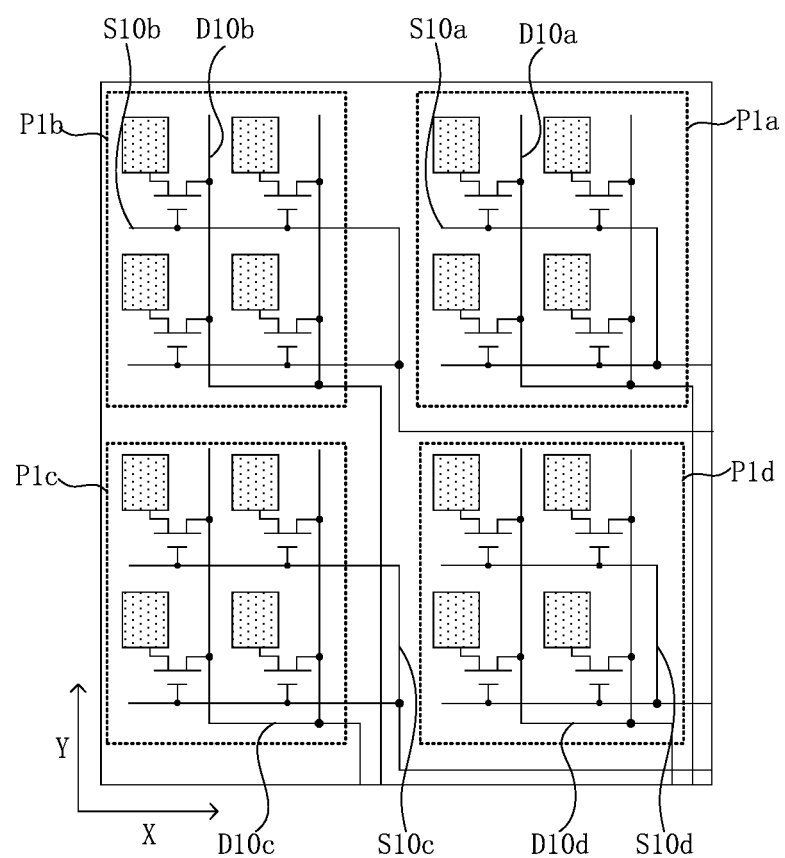
FIG. 4 is a partial plan view of yet another light modulating liquid crystal cell according to an embodiment of the present disclosure.

FIG. 4 is a partial plan view of yet another light modulating liquid crystal cell according to an embodiment of the present disclosure.

In an embodiment of the present disclosure, as shown in FIG. 4, the plurality of first sub-scanning lines of the same first scanning line S10 is electrically connected to each other between adjacent first pixels P1, that is, in the light-exiting area A1. To ensure the coincidence of the signals on the plurality of first sub-scanning lines of the first scanning line S10, the first scanning line S10 is divided into the plurality of first sub-scanning lines before the first scanning line S10 reaches the first pixel P1.

In an embodiment of the present disclosure, as shown in FIG. 4, the plurality of first sub-data lines of the same first data line D10 is electrically connected to each other between adjacent first pixels P1, that is, in the light-exiting area A1. To ensure the coincidence of the signals on the plurality of first sub-data lines of the first data line D10, the first data line D10 is divided into the plurality of first sub-data lines before the first data line D10 reaches the first pixel P1.

As shown in FIG. 2, a plurality of first pixel electrodes 12 are located in the light-exiting area A1 and are in one-to-one correspondence with the plurality of first sub-pixels P10, and each first pixel electrode 12 is electrically connected to the drain electrode of the first transistor 11 of the first sub-pixel P10 corresponding to the first pixel electrode 12. When the first transistor 11 is turned on, the signal voltage on the first data line D10 to which the source electrode of the first transistor 11 is connected is transmitted to the first pixel electrode 12, an electric field is generated between the first pixel electrode 12 and a first common electrode (not shown), and the electric field drives the liquid crystal molecules to deflect.

Figure 5:
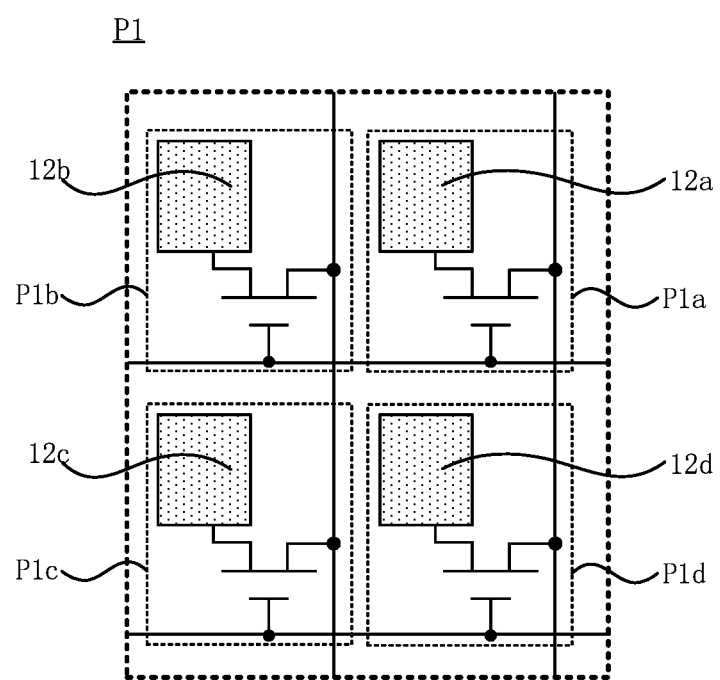
FIG. 5 is a plan view of a first pixel according to an embodiment of the present disclosure.

FIG. 5 is a plan view of a first pixel according to an embodiment of the present disclosure.

In an embodiment of the present disclosure, as shown in FIG. 5, the plurality of first pixel electrodes 12 corresponding to one first pixel P1 are insulated from each other. As shown in FIG. 5, the first pixel P1 includes the first sub-pixel P1a, the first pixel P1b, the first pixel P1c, and the first pixel P1d. The first sub-pixel P1a includes a first pixel electrode P12a. The first sub-pixel P1b includes a first pixel electrode P12b. The first sub-pixel P1c includes a first pixel electrode P12c. The first sub-pixel P1d includes a first pixel electrode P12d. The first pixel electrode P12a, the first pixel electrode P12b, the first pixel electrode P12c and the first pixel electrode P12d are electrically insulated from each other.

In an embodiment of the present disclosure, among all first sub-pixels P10 of the same first pixel P1, the first pixel electrodes 12 corresponding to at least two first sub-pixels P10 are electrically connected to each other.

Figure 6:
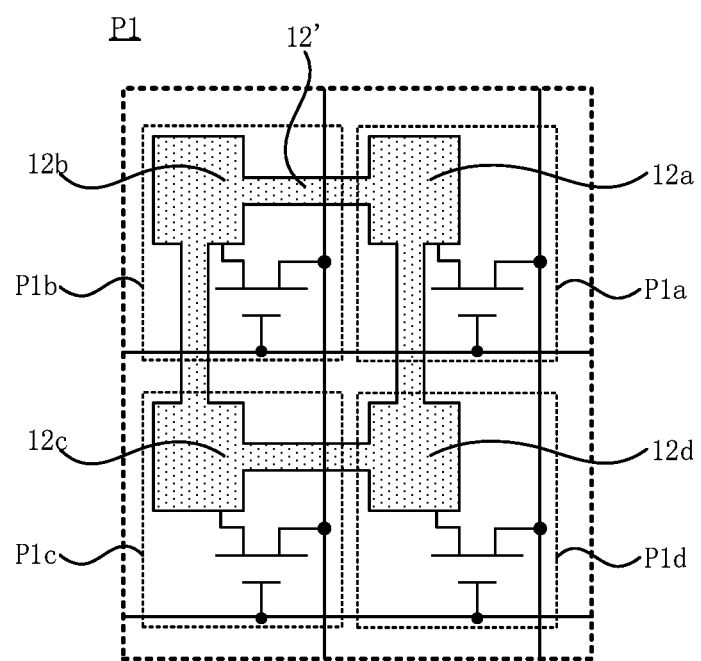
FIG. 6 is a plan view of another first pixel according to an embodiment of the present disclosure.

FIG. 6 is a plan view of another first pixel according to an embodiment of the present disclosure.

A technical scheme corresponding to the present implementation manner is described below. As shown in FIG. 6, in the first sub-pixels P10 of a same first pixel P1, the first pixel electrodes 12 corresponding to all of the first sub pixels P10 are electrically connected to each other through connection electrodes 12'. As shown in FIG. 6, the first pixel P1 includes the first sub-pixel P1a, the first sub-pixel P1b, the first sub-pixel P1c, and the first sub-pixel P1d. The first sub-pixel P1a includes a first pixel electrode P12a. The first sub-pixel P1b includes a first pixel electrode P12b. The first sub-pixel P1c includes a first pixel electrode P12c. The first sub-pixel P1d includes a first pixel electrode P12d. The first pixel electrode P12a and the first pixel electrode P12b are electrically connected through a connection electrode 12'. The first pixel electrode P12b and the first pixel electrode P12c are electrically connected through a connection electrode 12'. The first pixel electrode P12c and the first pixel electrode P12d are electrically connected through a connection electrode 12'. The first pixel electrode P12d and the first pixel electrode P12a are electrically connected through a connection electrode 12'.

Figure 7:
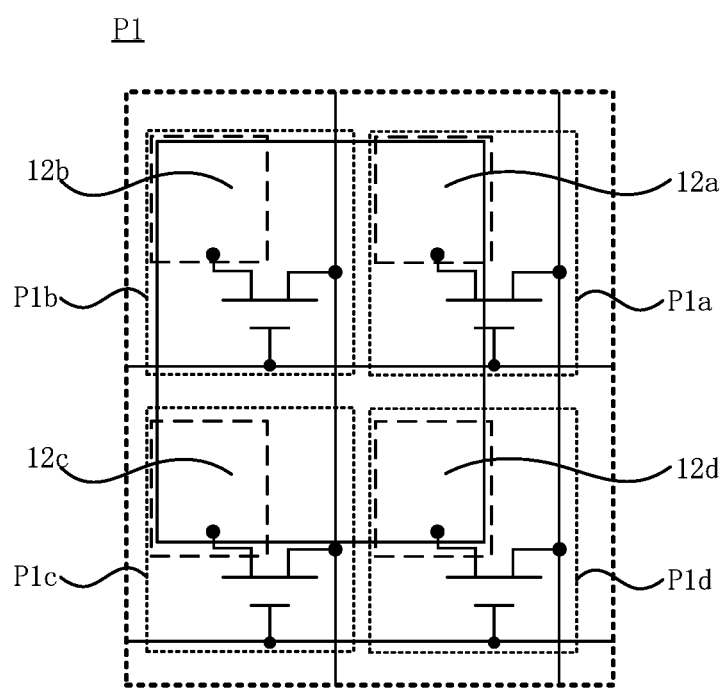
FIG. 7 is a plan view of yet another first pixel according to an embodiment of the present disclosure.

Another technical scheme corresponding to the present implementation manner is described below. As shown in FIG. 7, the plurality of first sub-pixels P10 in the same first pixel P1 are in a continuous planar structure. As shown in FIG. 7, the first pixel P1 includes the first sub-pixel P1a, the first sub-pixel P1b, the first sub-pixel P1c, and the first sub-pixel P1d. The first sub-pixel P1a includes a first pixel electrode P12a. The first sub-pixel P1b includes a first pixel electrode P12b. The first sub-pixel P1c includes a first pixel electrode P12c. The first sub-pixel P1d includes a first pixel electrode P12d. The first pixel electrode P12a, the first pixel electrode P12b, the first pixel electrode P12c, and the first pixel electrode P12d are in a form of a continuous (e.g., a contiguous or an un-interrupted) planar electrode. Since the first pixel electrodes 12 in the same first pixel P1 are in a form of a continuous planar electrode, the design difficulty is reduced, and the consistent of the potentials of the first pixel electrodes 12 in the first pixel P1 is ensured, such that the first pixel P1 has a uniform light transmitting luminance.

In the present disclosure, a plurality of first sub-pixels are disposed in the first pixel P1, on the one hand, the driving capability of the first pixel P1 can be increased, and on the other hand, the width of the signal line between the first pixels P1 can be reduced. In an embodiment, when the light modulating liquid crystal cell provided by embodiments of the present disclosure has the above benefits, the quantity of the first sub-pixels P10 in the first pixel P1 and the pixel density of the first pixels P1 satisfy the following formula: n=

$$n = \begin{cases} \left[\dfrac{101.6}{p}\right] + 1, & p > 25.4 \\ 5, & p \leq 25.4 \end{cases},$$

where p denotes the pixel density of the first pixels P1. The first pixel P1 includes n first sub-pixels P10 arranged adjacently in the first direction X and n first sub-pixels P10 arranged adjacently in the second direction Y, and "[ ]" denotes the rounding operation.

When the pixel density p of the first pixels P1 is within the following range, 50.8<p≤101.6, and n=2, that is when the pixel density p of the first pixels P1 is greater than 50.8 and smaller than or equal to 101.6, the first pixel P1 includes two first sub-pixels P10 adjacently arranged in the first direction X and two first sub-pixels P10 adjacently arranged in the second direction Y.

When the pixel density p of the first pixels P1 is within the following range: 33.86<p≤50.8, and n=3, that is when the pixel density p of the first pixels P1 is greater than 33.86 and smaller than or equal to 50.8, the first pixel P1 includes three first sub-pixels P10 adjacently arranged in the first direction X and three first sub-pixels P10 adjacently arranged in the second direction Y.

When the pixel density p of the first pixels P1 is within the following range: 25.4<p≤33.86, and n=4, that is when the pixel density p of the first pixels P1 is greater than 25.4 and smaller than or equal to 33.86, the first pixel P1 includes four first sub-pixels P10 adjacently arranged in the first direction X and four first sub-pixels P10 adjacently arranged in the second direction Y.

When the pixel density p of the first pixels P1 is within the following range: p≤25.4, and n=5, that is when the pixel density p of the first pixels P1 is smaller than or equal to 25.4, the first pixel P1 includes five first sub-pixels P10 adjacently arranged in the first direction X and five first sub-pixels P10 adjacently arranged in the second direction Y. Through simulation, when the pixel density of the first pixels P1 is smaller than or equal to 25.4, by arranging the quantity of the first sub-pixels in the first pixel P1 to be 5×5, a too large density of the first sub-scanning lines and/or first sub-data lines and the corresponding affecting on transmittance can be avoided.

Figure 8:
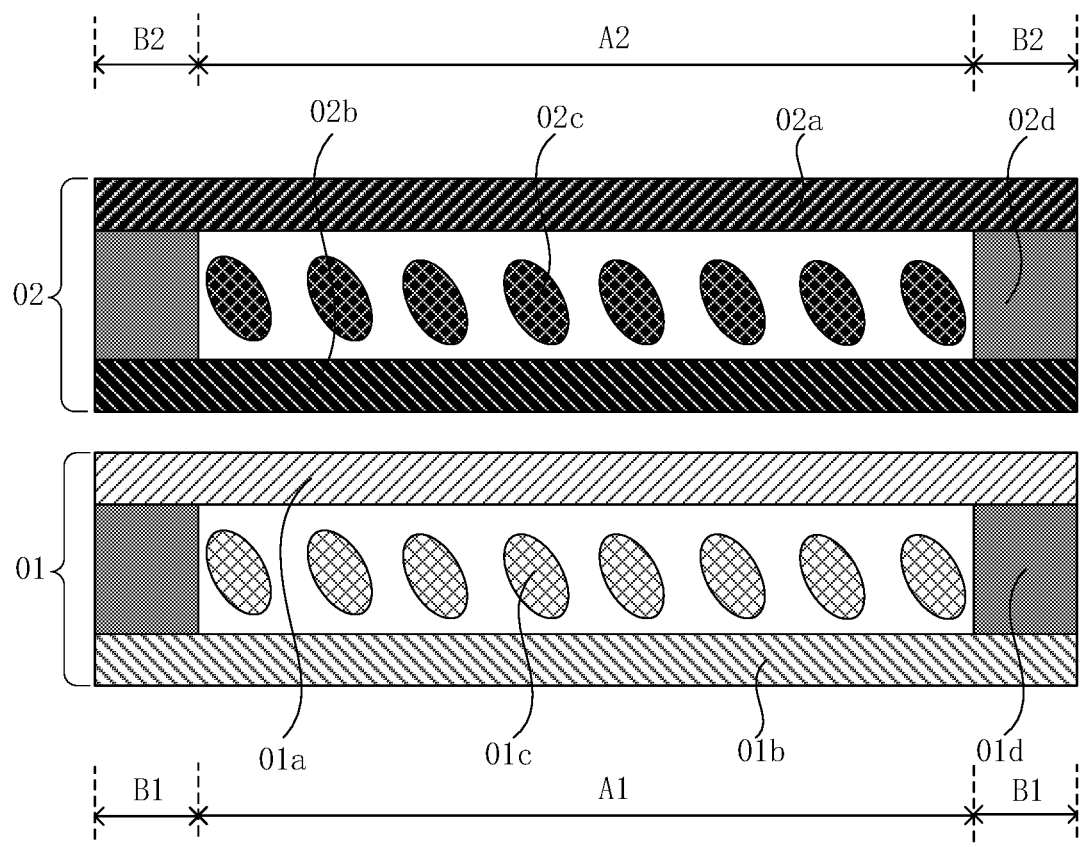
FIG. 8 is a schematic diagram of a display panel according to an embodiment of the present disclosure.

An embodiment of the present disclosure further provides a display panel. FIG. 8 is a schematic diagram of a display panel according to an embodiment of the present disclosure.

As shown in FIG. 8, a display panel 001 provided by the embodiment of the present disclosure includes the light modulating liquid crystal cell 01 provided by any embodiment described above. In addition, the display panel 001 provided by the embodiment of the present disclosure further includes a display liquid crystal cell 02 which stacked with the light modulating liquid crystal cell 01. The display liquid crystal cell includes a display area A2 and a non-display area B2 surrounding the display area A2. In a thickness direction of the display panel, the light-exiting area A1 of the light modulating liquid crystal cell 01 covers the display area A2 of the display liquid crystal cell 02, so the display area A2 of the display liquid crystal cell 02 can receive the light transmitting through the light modulating liquid crystal cell 01. That is, the light used by the display liquid crystal cell 02 for displaying is transmitted through the light modulating liquid crystal cell 01 and the transmission of the light is controlled by the light modulating liquid crystal cell 01.

Figure 9:
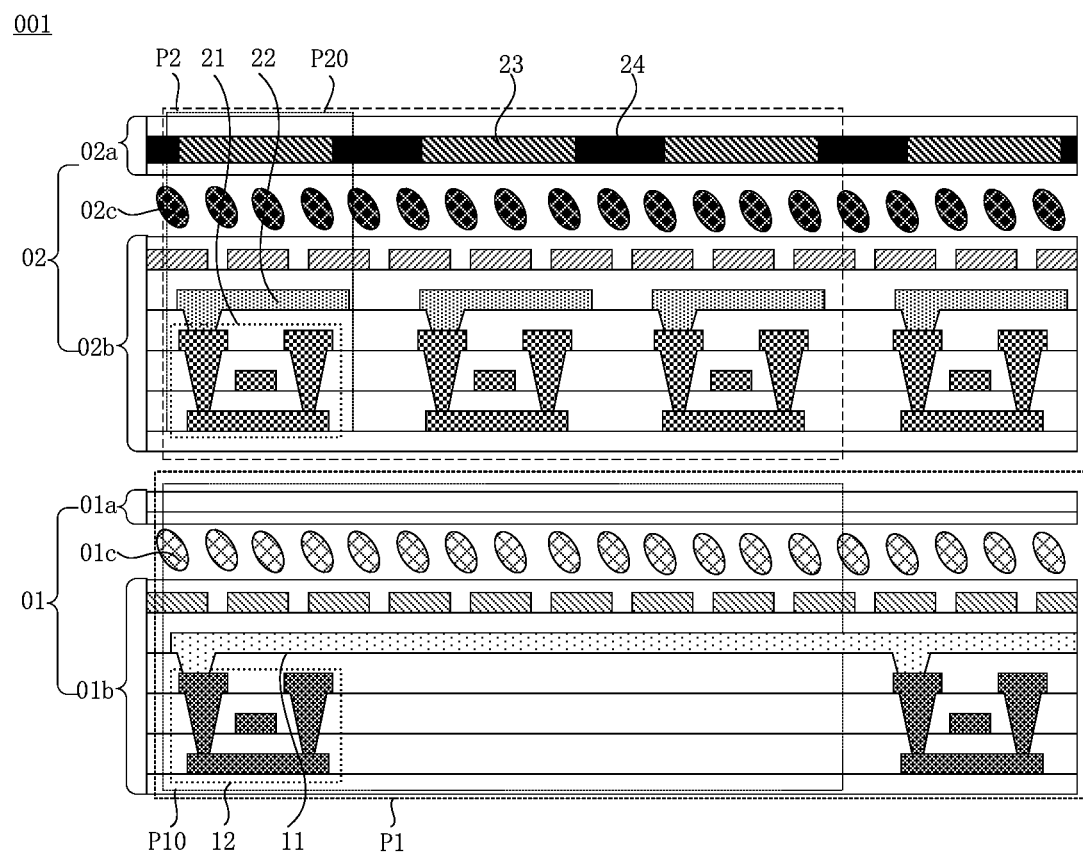
FIG. 9 is a partially enlarged schematic view of a display panel according to an embodiment of the present disclosure.

FIG. 9 is a partially enlarged schematic view of a display panel according to an embodiment of the present disclosure.

As shown in and FIG. 8 and FIG. 9, the display liquid crystal cell 02 can include a third substrate 02a, a second liquid crystal layer 02c, a fourth substrate 02b, and a second encapsulation structure 02d, which are arranged in the thickness direction of the light modulating liquid crystal cell 01. The third substrate 02a and the fourth substrate 02b are arranged opposite to each other, and the second liquid crystal layer 02c is arranged between the third substrate 02a and the fourth substrate 02b. Specifically, the second liquid crystal layer 02c is arranged at a position in the display liquid crystal cell 02 corresponding to the display area A2. When liquid crystal molecules in the second liquid crystal layer 02c are deflected under an electric field, light is allowed to pass, otherwise the light cannot pass. The second encapsulation layer 02d is arranged between the third substrate 02a and the fourth substrate 02b. Specifically, the second encapsulation layer 02d is arranged at a position in the display liquid crystal cell 02 corresponding to the non-display area B2, and is used to encapsulate the third substrate 02a and the fourth substrate 02b.

Figure 10:
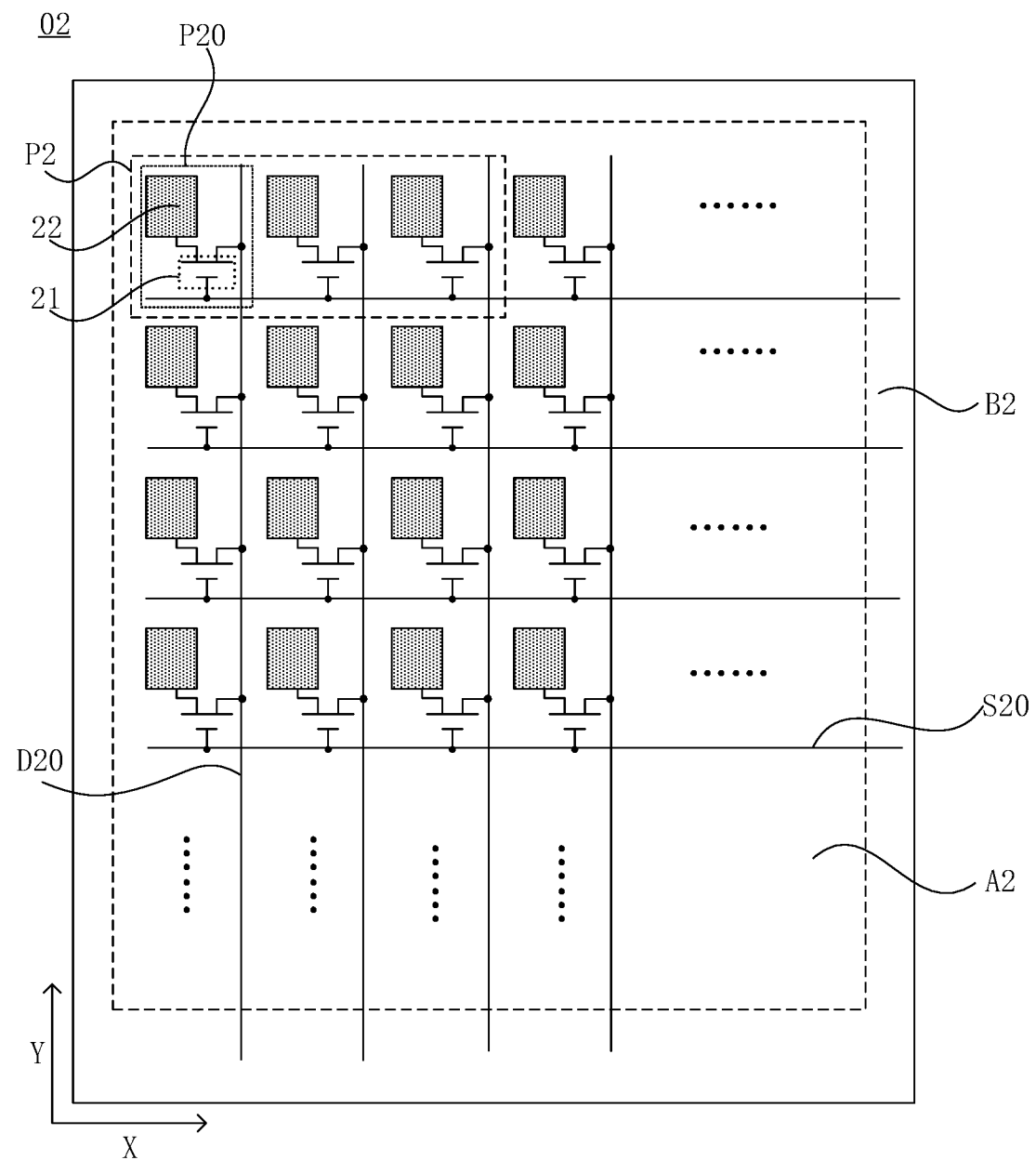
FIG. 10 is a plan view of a display liquid crystal cell according to an embodiment of the present disclosure.

FIG. 10 is a plan view of a display liquid crystal cell according to an embodiment of the present disclosure.

Referring to FIG. 10, a plurality of second pixels P2 are located in the display area A2, and each second pixel P2 includes a plurality of second sub-pixels P20. When the second sub-pixels P20 of the second pixel P2 emit light simultaneously, the second pixel P2 emits white light. That is, the plurality of second sub-pixels P20 of the second pixel P2 can emit red light, blue light, green light, and/or white light. In an embodiment of the present disclosure, the second pixel P2 can include three second sub-pixels P20.

Each second sub-pixel P20 includes a second transistor 21. The second transistor 21 can be configured to control a voltage, which is used for driving the liquid crystal molecules to deflect, to be transmitted to the corresponding second sub-pixel P20, thereby controlling the corresponding second sub-pixel P20 to be light transmissive. In the plurality of second pixels P20 of a same second pixel P2, gate electrodes of the second transistors 21 are electrically connected to a same second scanning line S20, and source electrodes of the second transistors 21 are electrically connected to a same second data line D20. That is, the gate electrodes of the second transistors 21 corresponding to the same second pixel P2 are electrically connected to a same second scanning line S20, and the source electrodes of the second transistors 21 corresponding to the same second pixel P2 are electrically connected to a same second data line D20. For the second transistors 21 corresponding to different second sub-pixels P20, the gate electrodes are electrically connected to different second scanning lines S20, respectively, or the source electrodes are electrically connected to different second data lines D20, respectively. The plurality of second sub-pixels P20 of the same second pixel P2 can emit light of different colors.

Continuing to refer to FIG. 9, the second pixel P2 in the display liquid crystal cell 02 includes color resists 23. Specifically, each second sub-pixel P20 includes a corresponding color resist 23, and a black matrix 24 is located between the color resists 23 of adjacent second sub-pixels P20. The color resist 23 allows light with a certain color to pass through, and thus the second sub-pixels 20 having the color resists 23 with different colors can emit light with different colors. The black matrix 24 can avoid optical cross-talk between adjacent second sub-pixels P20. The color resists 23 and the black matrix 24 are located on the side of the second transistors 21 facing away from the light modulating liquid crystal cell 01, that is, the light modulating liquid crystal cell 01 is disposed on the side of the display liquid crystal cell 02 opposite to the light-exiting side of the display liquid crystal cell 02.

It should be noted that the display liquid crystal cell 02 includes the color resists 23, but the light modulating liquid crystal cell 01 does not include the color resists 23. That is, the display liquid crystal cell 02 is used for displaying, while the light modulating liquid crystal cell 01 is used for controlling light from a certain region to be transmitted to the display liquid crystal cell 02 or not to be transmitted to the display liquid crystal cell 02.

Please refer to FIG. 9 and FIG. 10, the display liquid crystal cell 02 includes a plurality of second pixel electrodes 22 which are in one-to-one correspondence with the plurality of second sub-pixels P2, each second pixel electrode 22 is electrically connected to the drain electrode of the corresponding second transistor 21, and the plurality of second pixel electrodes 22 are insulated from each other. That is, the second pixel electrodes 22 of different second sub-pixels P20 respectively receive voltage signals for controlling the liquid crystal molecules in the second liquid crystal layer 02c corresponding to the different second sub-pixels P20 to deflect or not deflect, and the second pixel electrodes 22 of different second sub-pixels P20 can respectively control the different second sub-pixels P20 to emit light or not emit light.

The light modulating liquid crystal cell 01 includes a plurality of first pixel electrodes 12 which are in one-to-one correspondence with the plurality of first sub-pixels P10, and each first pixel electrode 12 is electrically connected to the drain electrode of the corresponding first transistor 11. The first pixel electrodes 12 of the same first pixel P1 receive the same signal at the same time, and thus the plurality of first sub-pixels P10 of the same first pixel P1 can be light transmissive at the same time or be opaque at the same time.

As shown in FIG. 9, when the area of the first pixel electrode 12 is larger than or equal to the area of the second pixel electrode 22, then one first pixel P1 can control the region of one or more second pixels P2 not to emit light, reducing the design difficulty of the light modulating liquid crystal cell 01 and reducing the power consumption.

Figure 11:
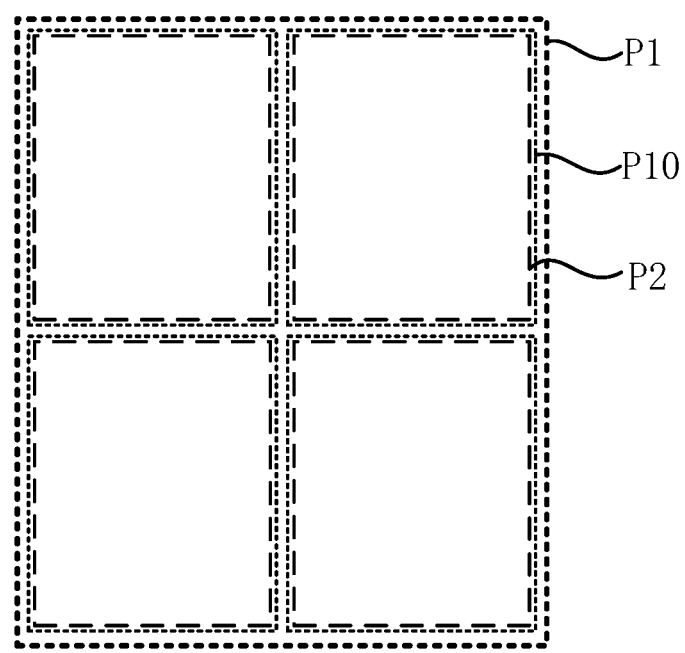
FIG. 11 is a schematic diagram showing a correspondence between the first pixels and the second pixels according to an embodiment of the present disclosure.
Figure 12:
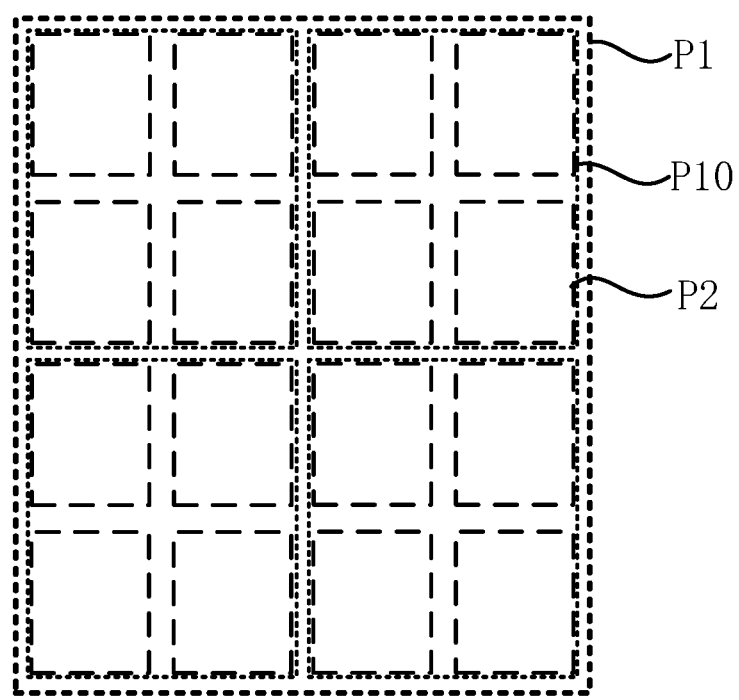
FIG. 12 is a schematic diagram showing another correspondence between the first pixels and the second pixels according to an embodiment of the present disclosure.

FIG. 11 is a schematic diagram showing a correspondence between the first pixels and the second pixels according to an embodiment of the present disclosure. FIG. 12 is a schematic diagram showing another correspondence between the first pixels and the second pixels according to an embodiment of the present disclosure.

As shown in FIG. 11 and FIG. 12, the area of the first pixel P1 is larger than the area of the second pixel P2, and the area of the first sub-pixel P10 of the first pixel P1 is larger than or equal to the area of the second pixel P2. When the second pixel P2 includes three second sub-pixels P20, the area of the first sub-pixel P10 is larger than or equal to a sum of the areas of three second sub-pixels P20.

In another embodiment of the present disclosure, each first sub-pixel P10 is arranged to correspond to an integer number of second pixel P2, and each first sub-pixel P10 is arranged to correspond to an integer number of second sub-pixel P20. As shown in FIG. 11, one first sub-pixel P10 corresponds to one second pixel P2. As shown in FIG. 12, one first sub-pixel P10 corresponds to multiple second pixels P2. In the thickness direction of the display panel 001, the region between the first sub-pixels P10 overlaps the region between the adjacent second pixels P2 corresponding to the first sub-pixels P10. In the thickness direction of the display panel, the first sub-scanning line and the first data line that corresponds to the first sub-pixel P10 coincide with at least part of the second scanning lines and the second data lines that corresponds to the second pixel P2. The display performance will be affected if the signal lines in the light modulating liquid crystal cell 01 are not covered.

It should be noted that embodiments of the present disclosure are described by taking the display panel 001 including one light modulating liquid crystal cell 01 as an example. In different embodiments, one display panel 001 can also include multiple light modulating liquid crystal cells 01 to further increase the contrast.

Figure 13:
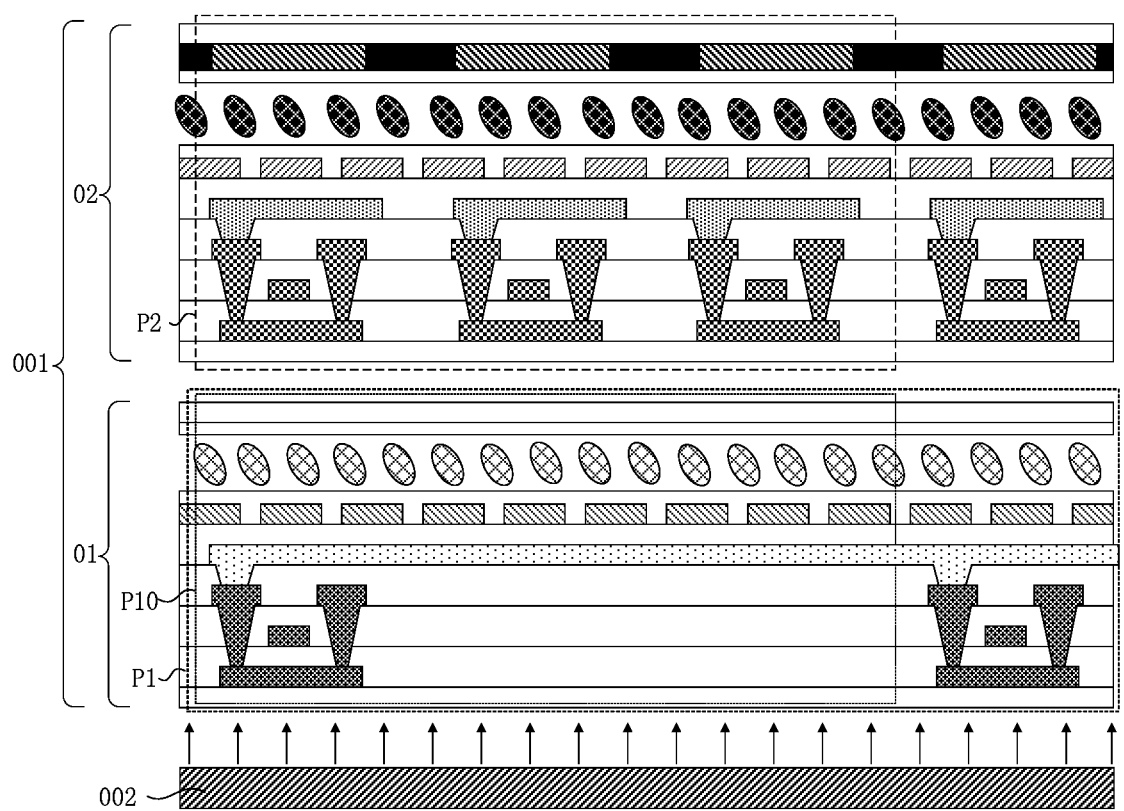
FIG. 13 is a partially schematic view of a display device according to an embodiment of the present disclosure.

An embodiment of the present disclosure further provides a display device. FIG. 13 is a partially schematic view of a display device according to an embodiment of the present disclosure.

As shown in FIG. 13, the display device provided by the embodiment of the present disclosure includes the display panel 001 described in any embodiment of the present disclosure and a backlight module 002. In the thickness direction of the display device, the backlight module 002 is located on the side of the light modulating liquid crystal cell 01 facing away from the display liquid crystal cell 02. The light emitted by the backlight module 002 is firstly irradiated to the light modulating liquid crystal cell 01. A part of the light modulating liquid crystal cell 01 can block the light, that is, this part of light is controlled to not reach the display liquid crystal cell 02. Therefore, when the light modulating liquid crystal cell 01 prevents light from reaching a part of the display liquid crystal cell 02, the black screen displayed by this part of the liquid cell 02 is sufficiently dark to increase the contrast of the display device.

In addition, an embodiment of the present disclosure further provides a display method of a display device. The display method achieves displaying by using the display device described in the above embodiments. A display process of the display device includes displaying a black image in a part region of the display device. When displaying the black image, in the first pixel P1 covered by the part region of the display device displaying the black image, all the first sub-pixels P10 of this first pixel P1 are opaque. The first pixel P1 covered by the part region of the display device displaying the black image is opaque, and therefore the light emitted by the backlight module 002 is prevented from reaching the display liquid crystal cell 02. Accordingly the black image displayed by this part region of the display device is sufficiently dark and the contrast of the display device is increased.

The above are merely some embodiments of the present disclosure, and are not intended to limit the present disclosure. Any modifications, equivalent substitutions or improvements made within the spirit and principles of the present disclosure shall be included in the protection scope of the present disclosure.

What is claimed is:

1. A light modulating liquid crystal cell, the light modulating liquid crystal cell having a light-exiting area and a non-light-exiting area surrounding the light-exiting area, and the light modulating liquid crystal cell comprising:
a plurality of first pixels located in the light-exiting area;
first scanning lines; and
first data lines,
wherein each of the plurality of first pixels comprises a plurality of first sub-pixels, each of the plurality of first sub-pixels comprises a first transistor, the plurality of first sub-pixels comprises at least two first sub-pixels arranged in a first direction and at least two first sub-pixels arranged in a second direction, and the first direction intersects the second direction;
wherein gate electrodes of the first transistors of the plurality of first sub-pixels of each of the plurality of first pixels are all electrically connected to one of the first scanning lines, and source electrodes of the first transistors are all electrically connected to one of the first data lines; and
wherein the plurality of first pixels is arranged in a density of p, and the plurality of first sub-pixels comprises n adjacent first sub-pixels disposed in the first direction and n adjacent first sub-pixels disposed in the second direction, where $$n = \begin{cases} \left[\frac{101.6}{p}\right] + 1, & p > 25.4 \\ 5, & p \leq 25.4 \end{cases}.$$

2. The light modulating liquid crystal cell according to claim 1, wherein in at least two first pixels of the plurality of first pixels that are arranged in the first direction, the gate electrodes of the first transistors of the at least two first pixels are all electrically connected to one of the first scanning line; and
wherein in at least two first pixels of the plurality of first pixels that are arranged in the second direction, the source electrodes of the first transistors of the at least two first pixels are all electrically connected to one of the first data lines.

3. The light modulating liquid crystal cell according to claim 2, wherein one of the first scanning lines to which the first transistors of one of the plurality of first pixels are electrically connected comprises a plurality of first sub-scanning lines that is arranged in the second direction, and the plurality of first sub-scanning lines is connected to each other in the non-light-exiting area.

4. The light modulating liquid crystal cell according to claim 3, wherein an interval between every two adjacent first sub-scanning lines of the plurality of first sub-scanning lines is smaller than or equal to 250 μm.

5. The light modulating liquid crystal cell according to claim 2, wherein one of the first data lines to which the first transistors of one of the plurality of first pixels are electrically connected comprises a plurality of first sub-data lines, the plurality of first sub-data lines are arranged in the first direction, and the plurality of first sub-data lines is electrically connected to each other in the non-light-exiting area.

6. The light modulating liquid crystal cell according to claim 5, wherein an interval between every two adjacent first sub-data lines is smaller than or equal to 250 μm.

7. The light modulating liquid crystal cell according to claim 1, wherein, among at least two first pixels of the plurality of first pixels that are arranged in the first direction, the gate electrodes of the first transistors of one of the at least two first pixels are electrically connected to one of the first scanning lines, and the gate electrodes of the first transistors of another one of the at least two first pixels are electrically connected to another one of the first scanning lines.

8. The light modulating liquid crystal cell according to claim 1, wherein, among at least two first pixels of the plurality of first pixels that are arranged in the second direction, the source electrodes of the first transistors of one of the at least two first pixels are electrically connected to one of the first data lines, and the source electrodes of the first transistors of another one of the at least two first pixels are electrically connected to another one of the first data lines.

9. The light modulating liquid crystal cell according to claim 1, further comprising:
a plurality of first pixel electrodes which are in one-to-one correspondence with the first sub-pixels of the plurality of first pixels, wherein each of the plurality of first pixel electrodes is electrically connected to a drain electrode of one of the first transistors of the first sub-pixels.

10. The light modulating liquid crystal cell according to claim 9, wherein the plurality of first pixel electrodes is insulated from each other.

11. The light modulating liquid crystal cell according to claim 9, wherein at least two of the plurality of first pixel electrodes correspond to at least two of the plurality of first sub-pixels of one of the plurality of first pixels and are electrically connected to each other.

12. The light modulating liquid crystal cell according to claim 11, wherein at least two of the plurality of first pixel electrodes correspond to the plurality of first sub-pixels of one of the plurality of first pixels and are electrically connected to each other.

13. The light modulating liquid crystal cell according to claim 1, wherein the first transistor comprises one of an amorphous silicon layer, a polysilicon layer and an oxide semiconductor layer.

14. A display panel, comprising:
the light modulating liquid crystal cell according to claim 1; and
a display liquid crystal cell stacked with the light modulating liquid crystal cell,
wherein the display liquid crystal cell has a display area and a non-display area surrounding the display area, and in a thickness direction of the display panel, the light-exiting area of the light modulating liquid crystal cell covers the display area of the display liquid crystal cell; and
wherein display liquid crystal cell comprises a plurality of second sub-pixels located in the display area, and each of the plurality of second sub-pixels comprises a second transistor and a color resist, wherein the second transistor comprises a gate electrode electrically connected to a second scanning line, and a source electrode electrically connected to a second data line, and the color resist is located on a side of the second transistor facing away from the light modulating liquid crystal cell.

15. The display panel according to claim 14, wherein the display liquid crystal cell comprises a plurality of second pixel electrodes, wherein the plurality of second pixel electrodes is insulated from each other, is in one-to-one correspondence with the plurality of second sub-pixels, and is electrically connected to drain electrodes of the second transistors of the plurality of second sub-pixels;

wherein the light modulating liquid crystal cell comprises a plurality of first pixel electrodes, wherein the plurality of first pixel electrodes is in one-to-one correspondence with the first sub-pixels of the plurality of first pixels, and is electrically connected to drain electrodes of the first transistor of the first sub-pixels of the plurality of first pixels; and wherein an area of each of the plurality of first pixel electrodes is greater than an area of each of the plurality of second pixel electrodes.

16. The display panel according to claim 15, wherein the area of the first pixel electrode is greater than or equal to a sum of areas of at least three second sub-pixels of the plurality of second sub-pixels.

17. The display panel according to claim 16, wherein each of the plurality of first sub-pixels is arranged in correspondence with an integer number of second sub-pixels of the plurality of second sub-pixels.

18. A display device, comprising:
the display panel according to claim 14; and
a backlight module,
wherein in a thickness direction of the display device, the backlight module is located on a side of the light modulating liquid crystal cell facing away from the display liquid crystal cell.

* * * * *